United States Patent
Lasson et al.

(10) Patent No.: US 6,783,823 B2
(45) Date of Patent: Aug. 31, 2004

(54) EMBOSSED PACKAGING LAMINATE AND METHOD OF MAKING LAMINATE

(75) Inventors: Rolf Lasson, Lund (SE); Karl-Håkan Sandell, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/276,259

(22) PCT Filed: May 15, 2001

(86) PCT No.: PCT/SE01/01063
§ 371 (c)(1),
(2), (4) Date: Nov. 15, 2002

(87) PCT Pub. No.: WO01/87587
PCT Pub. Date: Nov. 22, 2001

(65) Prior Publication Data
US 2003/0113487 A1 Jun. 19, 2003

(51) Int. Cl.⁷ ................................................ B32B 3/30
(52) U.S. Cl. .................. 428/34.2; 428/69; 428/72; 428/101; 428/116
(58) Field of Search ........................ 428/34.2, 69, 72, 428/101, 116

(56) References Cited
U.S. PATENT DOCUMENTS

| | | |
|---|---|---|
| 3,868,288 A | 2/1975 | Ercolano |
| 3,904,465 A | 9/1975 | Haase et al. |
| 4,395,254 A | 7/1983 | Schuster |
| 4,948,653 A | 8/1990 | Dinter et al. |
| 5,902,667 A | 5/1999 | Stahl |

FOREIGN PATENT DOCUMENTS

| | | |
|---|---|---|
| EP | 0240626 A1 | 10/1987 |
| EP | 0857563 A1 | 8/1998 |
| WO | 95/03173 | 2/1995 |

*Primary Examiner*—Sandra M. Nolan

(74) *Attorney, Agent, or Firm*—Burns, Doane, Swecker & Mathis, L.L.P.

(57) ABSTRACT

A multilayer structure intended for a packaging laminate with embossed appearance comprises a base layer and flexible, deformable layer disposed in planar relationship adjacent one another, with both layers adhesively bonded to one another along part surfaces of the total contact surface of each respective layer in a predetermined pattern. The flexible layer may be permanently deformed along the part surface or part surfaces that are in abutment against, but not adheringly bonded to the base layer, so that it substantially deviates from being in abutment against the base layer. Methods of producing a multilayer structure and a packaging laminate, as well as packaging containers produced from the packaging laminate are also disclosed.

14 Claims, 3 Drawing Sheets

EMBOSSED PACKAGING LAMINATE AND METHOD OF MAKING LAMINATE

FIELD OF THE INVENTION

The present invention relates to a laminated multilayer structure intended for a packaging laminate with embossed appearance, as well as such packaging laminate, a method of producing the laminated multilayer structure, and a method of embossing such packaging laminates, as well as packaging containers produced from the packaging laminate according to the present invention.

BACKGROUND OF THE INVENTION

Packages of single-use disposable type have long been employed for packing and transporting liquid foods. Such so-called single-use packages are often produced from a flexible packaging laminate with a plurality of layers which each afford specific properties to the packaging laminate. For example, such packaging laminates normally include outer layers possessing superior thermosealing properties in order to make for reforming into packaging containers by fold formation and sealing of the outer layers against one another. Such thermosealable layers normally consist of thermoplastic which also functions as liquid and moisture barrier, on the one hand preventing moisture from the ambient surroundings from penetrating into the packaging wall and into the packed food product, and, on the other hand, preventing the liquid food from leaking out through the packaging wall into the surroundings. Such packaging laminates often also include a rigidifying core layer in order to impart to the finished packaging container strength and configurational stability, normally of paper or paperboard. Core layers of thicker, homogeneous or foamed plastic layers are also common.

For longer storage time of packed food products, such packaging laminates often include layers which act as barriers against gases and vapours, such as, for example, oxygen gas, in particular in the storage of the packed foods for a lengthy period of time, since oxygen gas has a negative effect on food products and their content of nutritive substances, vitamins, flavourings, etc. A very common type of gas barrier layer is thin foils or layers of metal or metal oxide, for example aluminium foil (Alifoil), but layers of polymer possessing superior gas barrier properties are also common, such as, for example, polyamide, ethyl vinyl alcohol copolymers, polyvinyl alcohol, and others.

Packaging containers are often produced in that a web of such a packaging laminate is reformed into a tube by the longitudinal edges of the web being united with one another, whereafter the tube is filled with the intended contents and sealed along narrow, transverse and spaced-apart sealing zones. The sealed sections of the tube containing the contents are thereafter separated from the tube by means of incisions in these sealing zones and can be formed by folding into a final geometric configuration which partly depends on how the sealing joints or seams have been oriented. It is also common to manufacture packaging containers by forming, from sheet-shaped packaging blanks, a container which is sealed in one end (the bottom or the top) and along the longitudinal joint, the container being filled the liquid food and thereafter sealed also in its other end (the top or bottom).

The composition of such packaging laminates is intended to impart to the packed product the best possible product protection properties, at the same time as making the package easy to produce and easy to handle. A very important property in a food package is moreover that it be aesthetically appealing, and can impart and added value to the packed food product, i.e. is attractive for customers to buy. Such added value may be attained in various ways depending upon the product which is packed and the customer group or age group which represents the target group. For example, fruit juices are often packed in packaging containers provided with fresh printed decorative artwork depicting fruit themes in bright, fresh colours. Glossy metal colours and artwork are often seen as being fresh and attractive. Such colours and artwork can be applied by means of known printing technology. Another method of providing packages with decorative artwork is to emboss, i.e. add figures and patterns to the packaging material by deforming the material by pressing and/or shearing it within certain regions according to a desired pattern. Such embossing according to known technology may suitably be put into effect on a core layer of paper or paperboard or a metal layer included in a packaging laminate if this is sufficiently thick. By such means, shadow effects in the surface of the packaging material will be obtained and the desired pattern clearly manifests itself.

One drawback in such patterned pressing or shearing is that it requires specifically manufactured mechanical tools, for example an embossing roller, like the creasing tools which are common today for providing a packaging material with fold indications. Such embossing tools are expensive to manufacture, in particular given that patterns and decorative artwork are subject to fickle fashion and are quite often replaced and renewed. Another drawback is that such mechanical methods always entail that a three-dimensional pattern or deformation is displayed on both sides of the packaging material, i.e. not only towards the outside of the packaging container, but also on its inside, which may involve problems in adhesion to surrounding layers on the inside along the depressed or raised surfaces seen from the inside of the packaging container. Further, conventional embossing places high demands on deformability and flexibility in the material which is to be embossed. Thin thermoplastic layers and thin metal layers and metal films of the type which are employed today to impart to the package superior oxygen gas barrier properties (or alternatively gloss metal appearance) are not suitable for mechanical embossing according to the known techniques. Employing thicker, flexible metal layers suitable for traditional embossing is not cost-effective, nor is it to be sought-for from the points of view of the environment and recycling, for which reason the only option is to emboss one of the other layers included in the packaging laminate, for example the core layer of paper or paperboard.

SUMMARY OF THE INVENTION

One object of the present invention is therefore to realise a novel, laminated multilayer structure which makes for the production of a packaging laminate with embossed appearance, without associated problems of the type inherent in the prior art technology.

Another object of the present invention is to realise a multilayer structure for a packaging laminate which may simply be given an embossed appearance without the employment of specially manufactured mechanical embossing tools.

A further object of the present invention is to realise a multilayer structure for producing a packaging laminate in which only the one side displays the pattern with embossed appearance.

These and other objects have been attained by means of a multilayer structure possessing the characterising feature as set forth in the characterising clause of appended Claim 1.

Preferred embodiments of the multilayer structure according to the present invention have further been given the characterising features as set forth in appended subclaims 2 to 6.

One object of the present invention is also to realise a packaging laminate with embossed appearance as defined in Claim 7, comprising a multilayer structure according to the present invention in which the flexible, deformable layer is distanced from the base layer in those subregions where the two layers are not adhesively bonded to one another and by such means display a surface in relief along these regions according to the predetermined pattern.

According to one preferred embodiment of the present invention, a further object is to realise a multilayer structure and a packaging laminate whose one side displays a glossy metal and also embossed appearance.

This object is attained according to the present invention by means of the characterising feature as set forth in the characterising clause of appended Claims 2 or 3.

A further object of this preferred embodiment of the present invention is to realise a cost-effective packaging laminate with glossy metal decorative artwork and an embossed appearance, as well as possessing superior oxygen gas barrier properties.

The term 'multilayer structure' is here taken to signify a structure which consists of two or more part layers.

The 'flexible, deformable layer' is here taken to signify a layer which may consist of one or more part layers and which possesses such properties that it, after having been deformed, substantially remains in its deformed state and does not resiliently reassume its original state. Preferably, the above-mentioned flexible layer consists of aluminium foil, in the present case coated with a thin layer of a thermoplastic, such as, for example, LDPE (Low Density Polyethylene).

The term 'base layer' is here taken to signify a relatively more rigid layer, preferably of paper or paperboard. The base layer may also consist of one or more part layers.

The relatively rigid base layer is so stiff that it does not give way to the force which is applied on the flexible layer for deforming and distancing it away from the base layer so that the two layers substantially no longer abut against one another within the adhesion-free part surfaces. One preferred example of such a base layer is a paper or paperboard layer with a grammage of approximately 40–400 g/m$^2$. Other examples of base layers may be relatively rigid layers of homogeneous or foamed polymers. Depending upon the choice of plastic, such a layer should have a given minimum thickness in order not to be excessively pliable on the application of the above-mentioned deformation force.

The flexible, deformable layer is preferably a metal foil, most preferably an aluminium foil (Alifoil). With the correct choice of material, the flexible layer may consist of a polymer film or a metalised film of some type. Certain polymers are better suited to be able to be deformed in this manner, but most often need to be heated somewhat in order to assume another form than their original. Normally, such polymer layers should be heated to above their softening temperature during the deformation. The terms 'flexible' and 'deformable' are here taken to signify that the layer should be able to be deformed slightly in relation to its original, planar shape, so that it is distanced from the base layer and no longer abuts against it, and that it substantially remains in its deformed state after the deformation force has been removed. Persons skilled in the art with knowledge of different materials can select polymers or other non-metallic materials for this purpose by studying mechanical properties and flexibility data.

The two layers can be partly laminated and bonded to one another by means of an interjacent adhesion-promoting binder or a so-called adhesive. Such an adhesive may be an adhesion polymer which is activated to bond to a surface on the application heat and pressure, or a binder which functions as a glue also without the supply of heat. Adhesion polymers are generally known within the packaging laminate sector. Other thermoplastic polymers which function as binders between the two layers by the application of heat and pressure and may be applied in the form of dispersion or solution by means of conventional pressure application technology can be employed as the adhesion-promoting agent, such as, for example LDPE. Preferably, such an adhesive layer is applied on the relatively rigid base layer which is subsequently united with the flexible layer in a roller nip, preferably with heating to approx. 40–90° C., depending upon the choice of polymer or adhesion-promoting agent.

According to one preferred embodiment of the present invention, the adhesion-free surfaces along which the flexible layer is to be deformed can be created by an adhesion-inhibiting agent being applied to these surfaces. The base layer has then been pre-coated with a thermoplastic layer or an adhesion plastic layer which, on activation under heating and pressure in the same manner as above, may be bonded to the flexible layer. The adhesion-inhibiting agent is suitably a composition which can be applied with printing methods such as offset or flexo-printing. Conventional printing inks of the type which are employed for decorative artwork on packages for liquid foods today are generally preferred as adhesion-inhibiting agents, against a flexible layer of Alifoil or a thermoplastic coated Alifoil.

According to another aspect of the present invention, there will further be realised a method of producing a laminated multilayer structure intended for a packaging laminate with embossed appearance according to the present invention, and a method of producing the packaging laminate with embossed appearance according to the present invention, respectively. The methods according to the present invention has been given the characterising feature as set forth in appended Claims 8 and 11, respectively.

Advantageous and preferred embodiments of the method according to the present invention have further been given the characterising features as set forth in appended subclaims 9 to 10 and 12 to 13, respectively.

By disposing a relatively flexible layer adjacent a relatively more rigid base layer so that both layers adhere to one another only along those part surfaces of the total contact surface of each respective layer according to a predetermined pattern, the flexible layer may be distanced from the base layer with the aid of a tractive force from, for example, a tacky surface or by means of a vacuum, for the formation of a surface in relief. The flexible layer is deformed so as to remain in its distanced state, i.e. it substantially does not resiliently reassume its original state closely adjacent the base layer.

According to one embodiment of the method according to the invention, adhesion between the part surfaces along which the two layers are intended to adhere to one another is realised by applying an adhesion-promoting agent along these part surfaces and then laying the two layers against one another and causing them to pass through a roller nip, preferably a warm roller nip.

According to another preferred embodiment of the method according to the invention, at least one of the above-mentioned layers is coated with a thermoplastic layer and one of the layers is outermost coated with an adhesion-inhibiting agent according to a predetermined pattern along those part surfaces along which the two layers are intended not to adhere to one another, so that the two layers are caused to adhere to one another along the remaining part surfaces in that the two layers are placed against one another and pressed against one another on passage through a warm roller nip.

According to one preferred embodiment of the present invention, the packaging laminate is embossed in that the flexible layer is distanced from the base layer in those part regions where the two layers do not adhere to one another, by means of suction force from a vacuum device.

According to another preferred embodiment of the present invention, the flexible layer is distanced from the base layer by means of a tractive force from a tacky roller or a tacky film or tape.

According to a further aspect of the present invention, a decorative packaging container is realised by conventional fold formation and sealing of a sheet- or webshaped packaging laminate comprising a laminated multilayer structure according to the invention.

BRIEF DESCRIPTION OF THE DRAWINGS

The present invention will now be described in greater detail hereinbelow, with particular reference to the accompanying Drawings, in which.

Figure 1A:
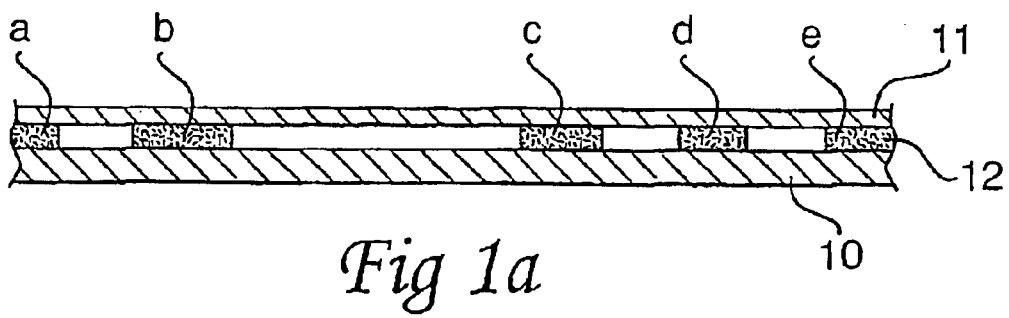
FIGS. 1a and 1b schematically illustrate cross sections of two preferred examples of a multilayer structure according to the present invention.

It should be observed that also other variations and embodiments than those described with particular reference to the accompanying Drawings are conceivable without departing from the scope of the inventive concept as this is defined in the appended Claims.

DETAILED DESCRIPTION OF THE INVENTION

FIG. 1 thus schematically illustrates a cross section of a multilayer structure with a relatively rigid based layer 10 of paper or paperboard and a flexible, deformable layer 11 of a thin aluminium foil. The flexible layer is flatly disposed adjacent and adheringly bonded to the base layer by means of an adhesion-promoting adhesive 12 which is applied on the base layer along at least one part surface or several part surfaces 12a, b, c, d, e, of the total contact surface of the layers against one another. Along those part surfaces which have not been coated with the adhesive, 12f, g, h, i, the base layer and the flexible layer are not interconnected to one another, but abut in almost planar relationship against one another. The adhesive layer 12 suitably consists of a glue which may be applied by means of printing technique. Preferably, such a glue possesses such properties that it is activated on the supply of heat, e.g. on passage through a warm roller nip. In the Figure, the adhesive layer has been given unproportionately large thickness in order better to illustrate how the two layers are bonded to each other, and is, in reality, approximately as thin as or thinner than the aluminium foil layer 11. Consequently, in reality the Alifoil layer appears to abut in wholly planar relationship against the base layer. Preferably, the Alifoil layer is approx. 5–10 μm thick, most preferably approx. 6–7 μm, and is preferably coated with a layer of a thermosealable thermoplastic, such as, for example, LDPE or LLDPE, at least on the other side facing away from the base layer, but, where applicable, also on that side which is turned to face towards the base layer. Preferably, the base layer is of a paperboard quality intended for the packing of liquid foods of conventional type, with a grammage of approx. 100–400 g/m².

Figure 1B:
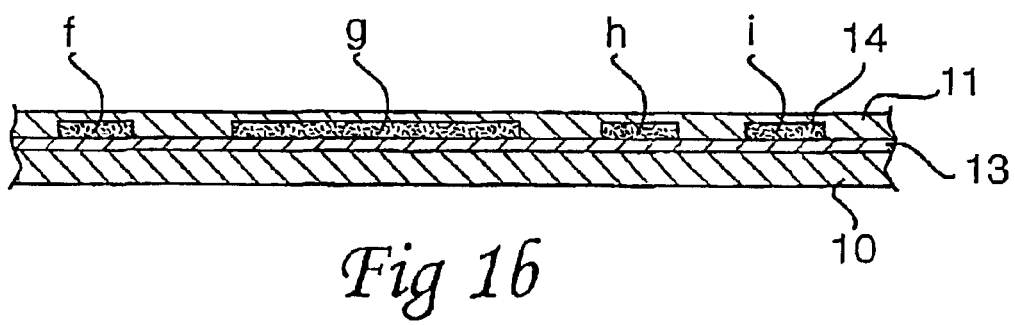

FIG. 1b shows a cross section through a similar multilayer structure with a relatively rigid base layer 10 consisting of paper or paperboard of the same type as in FIG. 1a and which has been coated with a thin thermoplastic layer 13, e.g. of LDPE or LLDPE, or alternatively of an adhesive plastic such as a polyolefin copolymerised or modified with (meth)acrylate- or (meth)acrylic acid monomers. A flexible, deformable layer 11 of a thin Alifoil has been disposed adjacent and permanently joined to the base layer along one or more part surfaces a, b, c, d, e, of the total contact surface of the two layers against one another by means of hot lamination of the thin thermoplastic layer against the Alifoil. The base layer and the applied thermoplastic layer 13 are first coated with an adhesion-inhibiting agent 14 in order to prevent the Alifoil from being bonded to the base layer on the hot lamination along the remaining part surfaces f, g, h, i. The hot lamination is then realised by applying heat and pressure simultaneously, preferably on passage through a warm roller nip. The adhesion-inhibiting agent 14 consists of an agent similar to artwork printing inks of conventional type. Such printing inks can be of flexo- or offset type and may be water based, solvent based or of the setting binder type (such as, for example, UV or EB setting). One such common water based printing ink is based on a pigmented composition with styrene and acrylate. UV setting printing inks normally form polyurethane acrylate copolymers, polyester acrylate copolymers or epoxy acrylate copolymers on setting and contain no solvent. Preferably, the Alifoil layer is approx. 5–10 μm thick, most preferably approx. 6–7 μm and is preferably coated with a layer of thermosealable thermoplastic such as, for example, LDPE or LLDPE, on the other side facing away from the base layer. The above-mentioned thermoplastic layer is approx. 8–20 μm thick, preferably approx. 10–15 μm, and most preferably approx. 12 μm.

Figure 2A:
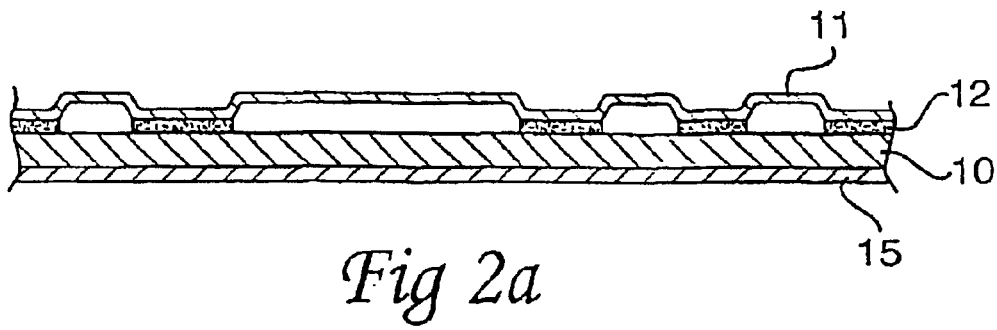
FIGS. 2a and 2b schematically illustrate cross sections of examples of two correspondingly preferred packaging laminates with embossed appearance according to the present invention.

FIG. 2a schematically shows a cross section of a packaging laminate with embossed appearance produced from the multilayer structure in FIG. 1a. The flexible and deformable layer of Alifoil 11 deviates substantially from being planar in abutment against the base layer 10 in those part surfaces along which the adhesion-promoting adhesive 12 is lacking. The Alifoil has been distanced from the base layer by means of a tractive force directed from the outside of the Alifoil. The packaging laminate suitably also includes an outer thermoplastic layer with liquid and vapour barrier properties as a thermosealable layer 15 disposed on the other side of the base layer.

Figure 2B:
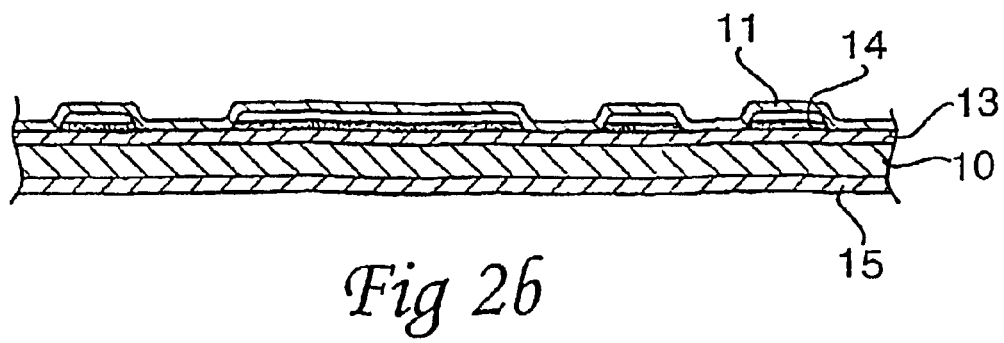

FIG. 2b schematically shows a cross section of a packaging laminate with embossed appearance produced from the multilayer structure in FIG. 1b. The flexible and deformable layer of Alifoil 11 deviates substantially from being planar in abutment against the base layer 10 in those part surfaces along which the adhesioninhibiting agent 14 is applied. The Alifoil has been distanced from the base layer by means of a tractive force directed from the outside of the Alifoil. The packaging laminate suitably also includes an outer thermosealable thermoplastic layer with liquid and vapour barrier properties 15 disposed on the other side of the base layer.

Figure 3:
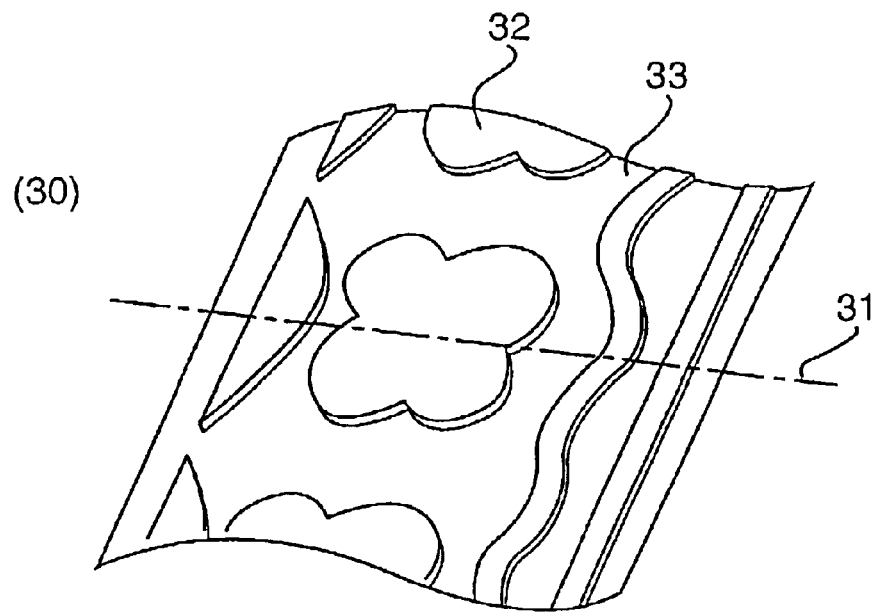
FIG. 3 schematically illustrates the "embossed" side of a packaging laminate with a surface in relief according to the present invention.

FIG. 3 schematically shows the artwork side of a packaging laminate with embossed appearance 30 according to the invention, seen from above. The ghosted line 31 shows where the cross sectional views in FIGS. 2a and 2b are taken. Along the part surfaces 32, the flexible layer is raised up from the base layer by deformation with a tractive force directed from the artwork side upwards in the Figure, so that it forms relief surface in relation to the other part surfaces 33 along which the flexible layer is adhesively bonded to the base layer.

Figure 4:
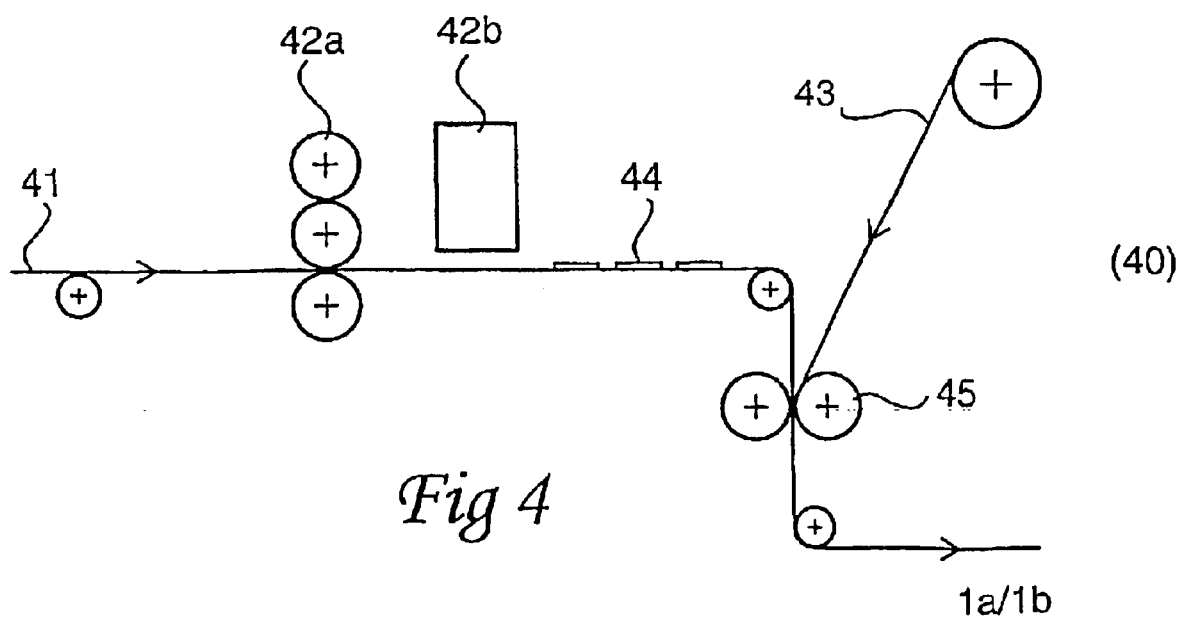
FIG. 4 schematically illustrates one preferred method of producing a laminated multilayer structure according to the present invention.

FIG. 4 schematically illustrates one preferred method of producing a multilayer structure according to the invention. With reference to FIG. 1a, a web 41 of a base layer of conventional paperboard quality of the type which is intended for packages for liquid foods is advanced to an applicator unit 42, for example consisting of pressure rollers 42a, for applying a layer of an adhesive, or alternatively of an adhesive of printing ink-like nature, and a drying/setting plant 42b disposed thereafter in the process.

The applicator unit 42, preferably a conventional artwork printing plant, thus applies some form of an adhesion-promoting agent for the embodiment as described in FIG. 1a and FIG. 2a, i.e. a glue or an adhesive composition such as, for example, a dispersion or a solution of an adhesive polymer. The adhesion-promoting agent is thus applied along those part surfaces on the surface of the paperboard web which are intended to be bonded adhesively to the flexible, deformable layer which is to give the finished packaging material its embossed appearance.

The Alifoil 43 preferably employed as flexible layer is unwound from a magazine reel and laminated to the paperboard web 44 coated with adhesive along the above-mentioned part surfaces, in that both of the webs 43 and 44 are pressed against one another under heating in that they are caused to pass through a warm roller nip 45. The adhesive layer is thus activated by the supply of heat, and the temperature in the warm roller nip depends largely upon what type of adhesive is employed. The temperature in the roller nip is normally approx. 40–60° C.

The Alifoil web may suitably be coated on the other side facing away from the paperboard web with a thin thermoplastic layer, preferably of LDPE or LLDPE in order correspondingly to provide the outside with a flexible, liquid-tight and, thermosealable layer. This thermoplastic layer is approx. 8–20 $\mu$m thick, preferably approx. 10–15 $\mu$m, most preferably approx. 12 $\mu$m.

To the same end, the paperboard web 41 may also suitably be coated with an outer layer of thermoplastic of the above-mentioned type on its other side facing away from the Alifoil. Alternatively, the paperboard web 41 may be coated with a thermoplastic in a final extrusion coating stage. By such means, there will be obtained a simple, cost-effective packaging laminate which may simply be given an embossed appearance in, for example, the method described with reference to FIG. 5a or 5b.

According to the most preferred embodiment for reducing the invention according to FIG. 1b into practice, a multilayer structure is manufactured in a similar manner, but the difference is instead that an adhesion-inhibiting agent is applied in the applicator unit 42. The paperboard 41' is then coated with a thermoplastic or thermoactivable adhesive polymer. As adhesion-inhibiting agent, so-called antiadhesive or adhesive, use is made of a conventional printing ink of the type which is employed as decorative artwork ink for packaging containers for liquid foods today, for example a UV setting composition of a water- or spirit-based composition. By such means, the adhesive properties of the thermoplastic layer coated on the paperboard web 41' will be deactivated for obtaining a web 44' which is coated with adhesive along those part surfaces which are not intended to adhere to the flexible layer of Alifoil 43'. The Alifoil may be coated with a thermoplastic on one or both sides, on the outer side intended for liquid barrier and thermosealing and on the inner side facing towards the paperboard web in order to afford better adhesion to the web 44' along the adhesive-free surfaces.

The two layers 43' and 44' are laminated to one another along the adhesive-free part surfaces, in that the thermoplastic coating on the paperboard web 44' is sealed against the Alifoil or, where applicable, the thermoplastic-coated Alifoil, by means of heat and pressure in-the warm roller nip. The thermoplastic layer/layers are heated in the roller nip to above the softening temperature Tg and are caused to fuse together by fusion/melting together.

Figure 5A:
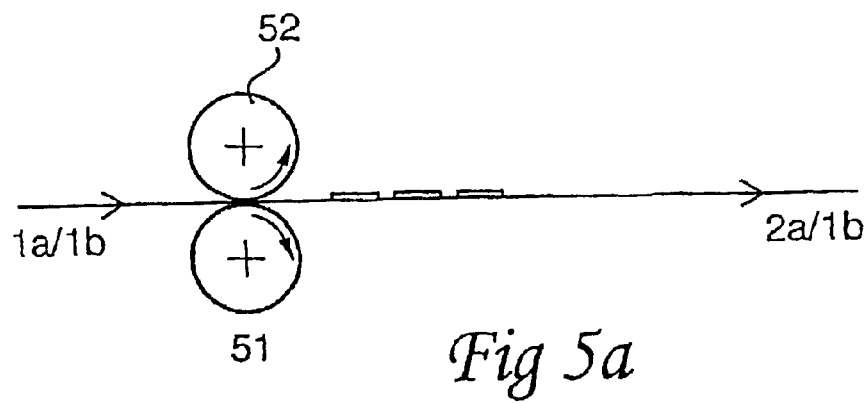
FIGS. 5a and 5b schematically illustrate two preferred methods of embossing the packaging laminate according to the present invention.
Figure 5B:
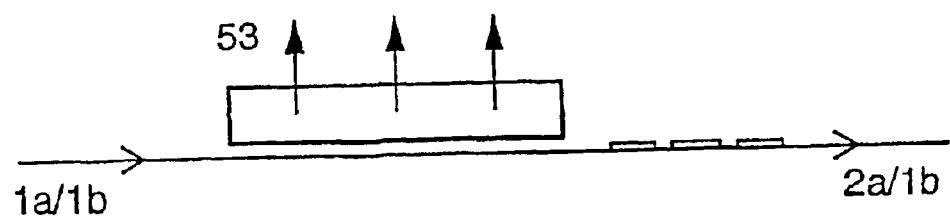

Also using this embodiment, which in terms of method, is to be preferred, there will be obtained a simple, cost-effective packaging laminate which may simply be given an embossed appearance in, for example, the manner described with, reference to FIG. 5a or 5b.

FIG. 5 shows two preferred methods of creating a relief surface in the obtained packaging laminate in FIGS. 2a/b or the multilayer structure in FIGS. 1a/b so that the decorative artwork side of the packaging laminate can be given an embossed appearance at an appropriate opportunity in the reforming process from packaging laminate into packaging containers.

The flexible layer is distanced from the base layer along the adhesive-free part surfaces by applying a tractive force to the flexible layer. This is realised, according to one preferred embodiment of the present invention as shown in FIG. 5a. The packaging laminate is caused to pass an "embossing station" 51 with a roller 52 which, to a suitable extent, tacks against the surface of the flexible layer so that this is pulled in the movement of the roller and lifted from the base layer for obtaining a surface in relief. The same effect can be achieved with the tacky surface of a tape or adhering film. Such a variation of the tacky and pull embossing is also conceivable on the finished packaging container, for example as an event in advertising purposes or to entertain the consumer, for example on a children's package.

According to another preferred embodiment of the method according to the invention, the same tractive force on the flexible layer from the base layer will be achieved by means of the application of suction forces or vacuum 53. Such vacuum devices are conventionally known for various purposes, so-called suction boxes, and may be readily adapted to this end. One such method is illustrated in FIG. 5*b*.

Figure 6:
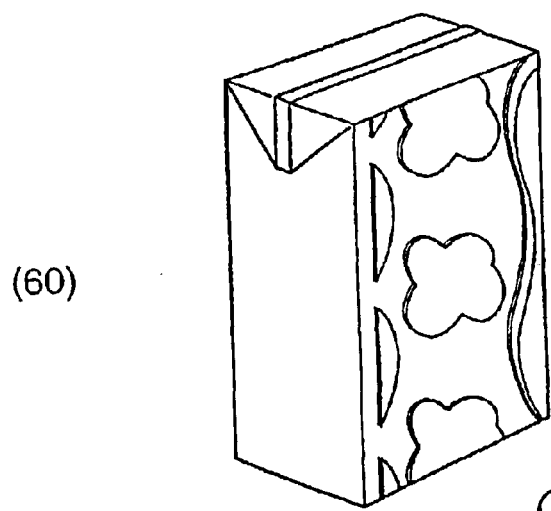
FIG. 6 shows one of many conceivable types of packaging container produced from a multilayer structure according to the present invention.

FIG. 6 shows a conventional packaging container which has an embossed appearance in the outside decorative artwork. For example the invention may be applied to conventional packaging containers of the Tetra Brik® type, but also other types of packaging containers are conceivable.

It will thus have been apparent from the foregoing description that the present invention, in a simple manner and with simple means and at reduced cost, attains the objects for realising a decorative, well-functioning packaging laminate and decorative packaging containers with embossed appearance produced therefrom.

What is claimed is:

1. A multilayer structure intended for a packaging laminate with embossed appearance, wherein it comprises a relatively rigid base layer and a flexible, deformable layer disposed in planar relationship adjacent one another, in that the two layers are adhesively bonded to one another along part surfaces of the total contact surface of each respective layer according to a predetermined pattern; and that the flexible layer may be permanently deformed along the part surface or part surfaces which are abutting against but not adheringly bonded to the base layer, so that it will substantially deviate from being in abutment against the base layer, wherein (i) the contact surface of one of said layers has been coated with an adhesion-promoting agent according to the predetermined pattern on the part surfaces (a, b, c, d, e) alone which both of said layers are intended to be adhesively bonded to one another, or (ii) the contact surface of one of said layers has been coated with an adhesive-inhibiting agent according to the predetermined pattern only on those part surfaces (f, g, h, i) along which both layers are intended not to be adhesively bonded to one another.

2. The multilayer structure as claimed in claim 1, wherein the flexible, deformable layer includes a metal foil or a metallized film.

3. The multilayer structure as claimed in claim 1, wherein the flexible, deformable layer comprises an aluminium foil.

4. The multilayer structure as claimed in claim 1, wherein the base layer comprises a core layer of paper or paperboard.

5. The multilayer structure as claimed in claim 1, wherein the contact surface of one of said layers has been coated with an adhesion-promoting agent according to the predetermined pattern on the part surfaces (a, b, c, d, e) along which both of said layers are intended to be adhesively bonded to one another.

6. The multilayer structure as claimed in claim 1, wherein the contact surface of one of said layers has been coated with an adhesive-inhibiting agent according to the predetermined pattern only on those part surfaces (f, g, h, i) along which both layers are intended not to be adhesively bonded to one another.

7. A packaging laminate with embossed appearance comprising a multilayer structure as claimed in claim 1, wherein the flexible layer is distanced from the base layer in those part regions (f, g, h, i) where both of the layers are not adhesively bonded to one another and by such means display a surface in relief along these regions in accordance with the predetermined pattern.

8. A method of producing a multilayer structure (1*a*; 1*b*) intended for a packaging laminate with embossed appearance, wherein a flexible layer is disposed adjacent a relatively more rigid base layer, wherein (i) the contact surface of one of said layers has been coated with an adhesion-promoting agent according to the predetermined pattern on the part surfaces (a, b, c, d, e) along which both of said layers are intended to be adhesively bonded to one another, or (ii) the contact surface of one of said layers has been coated with an adhesive-inhibiting agent according to the predetermined pattern only on those part surfaces (f, g, h, i) along which both layers are intended not to be adhesively bonded to one another, where after the two layers are caused to adhere, and not to adhere, respectively, to one another along said part surfaces (a, b, c, d, e; f, g, h, i) of the total contact surface of each respective layer according to the predetermined pattern.

9. The method as claimed in claim 8, wherein one of said layers is coated with an adhesion-promoting agent according to the predetermined pattern on those part surfaces along which both layers are intended to adhere to one another, and that the coated layer is thereafter caused to adhere to the flexible layer along these part surfaces on passage through a roller nip, preferably a warm roller nip.

10. The method as claimed in claim 8, wherein at least one of said layers is a thermoplastic-coated layer; and that the same or the other of said layers is coated with an adhesion-inhibiting agent according to the predetermined pattern on those part surfaces along which both layers are intended not to adhere to one another; and that the two layers are thereafter caused to adhere to one another along remaining part surfaces on passage through a warm roller nip.

11. A method of producing a packaging laminate with embossed appearance from a multilayer structure as claimed in claim 1, wherein the flexible layer is distanced from the adjacent base layer in the part region or part regions along which both layers are not adhesively bonded to one another, for obtaining a surface in relief (2*a*; 2*b*; 32) along these regions according to the predetermined pattern.

12. The method as claimed in claim 11, wherein the flexible layer is distanced from the base layer, along those part regions in which both layers do not adhere to one another, by means of vacuum.

13. The method as claimed in claim 11, wherein the flexible layer is distanced from the base layer, along those part regions in which both layers do not adhere to one another, by means a tacky roller or tape.

14. A packaging container produced from a packaging laminate comprising a multilayer structure as claimed in claim 1.

* * * * *

UNITED STATES PATENT AND TRADEMARK OFFICE
CERTIFICATE OF CORRECTION

PATENT NO. : 6,783,823 B2
DATED : August 31, 2004
INVENTOR(S) : Rolf Lasson et al.

It is certified that error appears in the above-identified patent and that said Letters Patent is hereby corrected as shown below:

Title page,
Add Item:
-- [30] Foreign Application Priority Data
  0001802-8; Sweden; May 16, 2000 --

Column 9,
Line 32, please change "alone" to -- along --

Signed and Sealed this

First Day of March, 2005

JON W. DUDAS
*Director of the United States Patent and Trademark Office*